Figure 1:
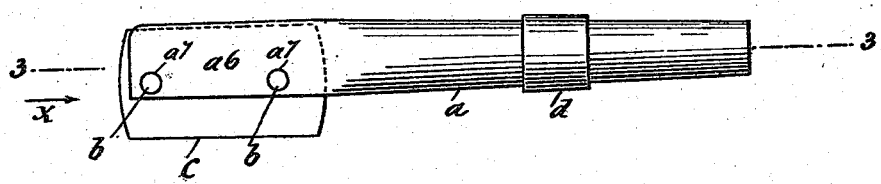

No. 840,748. PATENTED JAN. 8, 1907.
R. P. CAFFERTY, Jr.
HANDLE FOR SAFETY RAZOR BLADES.
APPLICATION FILED FEB. 6, 1906.

WITNESSES
Ernest A Hagen
T. A. Stewart

INVENTOR
Ridner P. Cafferty, Jr.
BY Edgar Tate & Co.
ATTORNEYS.

UNITED STATES PATENT OFFICE.

RIDNER P. CAFFERTY, JR., OF BROOKLYN, NEW YORK.

HANDLE FOR SAFETY-RAZOR BLADES.

No. 840,748.     Specification of Letters Patent.     Patented Jan. 8, 1907.

Application filed February 6, 1906. Serial No. 299,697.

*To all whom it may concern:*

Be it known that I, RIDNER P. CAFFERTY, Jr., a citizen of the United States, residing at Brooklyn, in the county of Kings and State of New York, have invented certain new and useful Improvements in Handles for Safety-Razor Blades, of which the following is a specification, such as will enable those skilled in the art to which it appertains to make and use the same.

This invention relates to safety-razor blades of the class known as "Gillette" razors; and the object thereof is to provide a handle for the blades of razors of this class with which the blade may be securely connected at any time for the purpose of honing or sharpening said blade.

The invention is fully disclosed in the following specification, of which the accompanying drawings form a part, in which the separate parts of my improvement are designated by suitable reference characters in each of the views, and in which—

Figure 2:
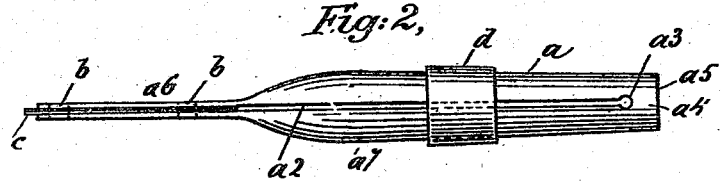
Figure 3:
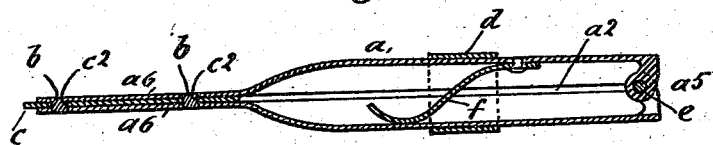
Figure 4:
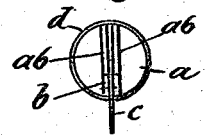

Figure 1 is a side view of my improved handle for safety-razor blades and showing a blade connected therewith; Fig. 2, a view at right angles to Fig. 1; Fig. 3, a longitudinal section on the line 3 3 of Fig. 1, but showing a modification; and Fig. 4, an end view looking in the direction of the arrow $x$ of Fig. 1.

In the practice of my improvement, as shown in Figs. 1 and 2, I provide a handle $a$, which is composed of a tube of spring metal split longitudinally from one end approximately to the other, as shown at $a^2$, the split consisting of a longitudinal slot or opening which terminates at $a^3$ in a circular opening, the separate parts of the handle being connected at the end adjacent to the circular opening $a^3$ by integral portions $a^4$. The end portions of the separate parts of the handle opposite the end $a^5$ of said handle are formed into flat jaws $a^6$, and said jaws are provided with circular holes or apertures $a^7$, and secured in the holes or apertures $a^7$ of one of the jaws are lugs $b$. I have also shown at $c$ an ordinary Gillette safety-razor blade, or a safety-razor blade of the Gillette class, and these, as is well known, are provided with circular holes or apertures $c^2$, by means of which they are secured in the framework of the razor, and in practice the holes or apertures $a^7$ and the lugs $b$ are spaced so as to correspond with the holes or apertures $c^2$ in the blade $c$.

When the handle is made in the manner shown in Figs. 1 and 2, the separate parts thereof have a spring action, and that part of the handle at $a^7$ adjacent to the jaws $a^6$ is thicker than the remaining portion thereof, the handle being tapered from the part $a^7$ toward the end $a^5$, and mounted thereon is a longitudinally-movable sleeve $d$, and in practice the sleeve $d$ is moved in the direction of the jaws $a^5$ to cause said jaws to securely grasp and hold the blade $c$, and whenever it is desired to remove said blade the sleeve $d$ is moved in the opposite direction. This construction forms a simple, effective, and convenient handle for holding the blade $c$ while sharpening the same or honing the same, and in this way the life or use of the blade may be indefinitely extended.

In the construction shown in Fig. 3, the separate parts of the handle $a$ are pivoted or hinged together at the end $a^5$, as shown at $e$, and placed between said parts of the handle is a spring $f$, which operates to force said parts outwardly or to separate said parts, and the sleeve $d$, which is also employed in this form of construction, will operate in the same manner as with the construction shown in Figs. 1 and 2.

In both forms of construction shown the handle is hollow or tubular in form and the separate parts thereof are segmental in cross-section; but the separate parts of the handle need not necessarily be segmental in cross-section, and other forms may be adopted, if desired, and any suitable form of a spring may be employed to separate the parts of the handle in the construction shown in Fig. 3.

This device is simple in construction and comparatively inexpensive and may be used as a handle for all safety-razor blades of the class described.

Having fully described my invention, what I claim as new, and desire to secure by Letters Patent, is—

A handle for razor-blades, said handle being tubular in form and larger at one end than at the other and composed of two parts, which are concavo-convex in cross-section, said parts being connected at one end and flattened at the other end to form parallel flat jaws, one of said jaws being provided at intervals with holes or apertures and the other with lugs adapted to pass through said holes or apertures, a spring placed between the handle members for forcing them apart and a sleeve mounted on said handle and adapted when moved in one direction to force the separate parts thereof and the said jaws together.

In testimony that I claim the foregoing as my invention I have signed my name, in presence of the subscribing witnesses, this 3d day of February, 1906.

RIDNER P. CAFFERTY, JR.

Witnesses:
F. A. STEWART,
C. E. MULREANY.